March 25, 1924.
T. E. MURRAY
WHEEL
Filed July 11, 1921
1,487,754
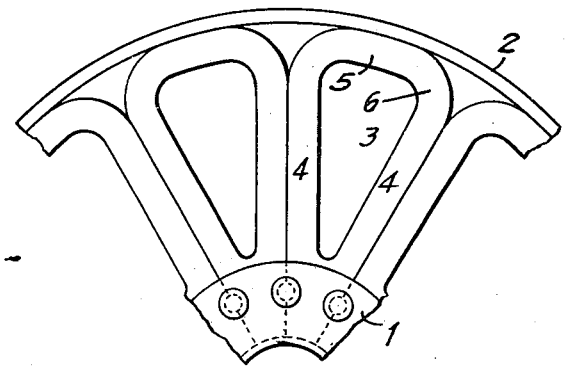
Fig.1,
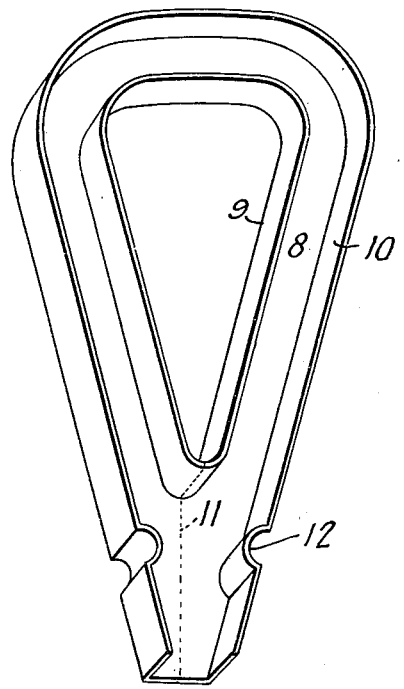
Fig.3,
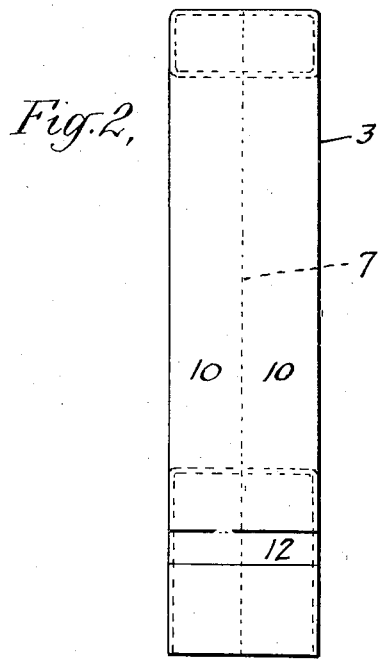
Fig.2,
Inventor
Thomas E. Murray
By his Attorney Patented Mar. 25, 1924.

1,487,754

UNITED STATES PATENT OFFICE.

THOMAS E. MURRAY, OF BROOKLYN, NEW YORK.

WHEEL.

Application filed July 11, 1921. Serial No. 483,656.

*To all whom it may concern:*

Be it known that I, THOMAS E. MURRAY, a citizen of the United States, and resident of Brooklyn, New York, have invented certain new and useful Improvements in Wheels, of which the following is a specification.

My invention aims to provide an improved construction, designed particularly for the wheels of automobile trucks and built up of steel; though the wheel may be used for other purposes and may be built in whole or in part of other metal.

The accompanying drawings illustrate an embodiment of the invention.

Fig. 1 is an elevation of a portion of a wheel;

Fig. 2 is a side elevation of one of the spoke members;

Fig. 3 is a perspective view of a segment from which such spoke members are made.

Referring to the embodiment of the invention illustrated the wheel comprises a hub of which the plate 1 forms a part, a felloe 2 and a number of intermediate members, indicated as a whole by the number 3 which are arranged with their sides in engagement with those of the adjacent similar members. Each of these members 3 has legs 4 meeting at the center and diverging outward and connected at their ends by a transverse portion 5 which extends for part of its length in a circular direction for engagement with the felloe and is connected by rounded corners 6 with the straight legs at the sides.

Each of the intermediate members is hollow and preferably substantially rectangular in cross-section and is made up of a pair of segments like Fig. 3, placed with their flanges edge to edge and welded together, the dotted line 7, Fig. 2, indicating the welded joint. Each of the segments is of channel shape and may be of ordinary commercial channel bars with a base 8 and flanges 9 and 10. Such a bar is bent around to the triangular shape of Fig. 3 and the legs thereof may be united by welding along the line indicated at 11. The outer flange 10 is pressed in to form sockets 12 for the bolts which fasten the intermediate members in the hub of the wheel.

A member formed and built up in this way has the metal therein distributed to the greatest advantage and can be produced by very simple operations on comparatively cheap commercial shapes of steel. The sides formed from the flanges 9 and 10 are in axial planes, or they may be in planes, not coincident with but parallel to the axis. They extend the full thickness of the members and therefore constitute a powerful resistance to pressures in the axial direction.

Each of what I have called the intermediate members 3 constitutes in effect two legs 4 forming respectively parts of two successive spokes and an integral connection 5 between such legs and consequently between each two spokes. The connecting members 5 thus serve the principal purpose of the usual felloe of connecting the spokes and holding them in place and furnishing a bearing for the rim of the wheel; and it will be understood that the felloe 2 shown in the drawings may be omitted.

Though I have described with great particularity in detail a certain particular embodiment of my invention, yet it is not to be understood therefrom that the invention is restricted to the particular embodiment described. Various modifications may be made by those skilled in the art in the detail and in the arrangement of the parts without departing from the invention as defined in the following claims.

What I claim is:

1. A wheel comprising members intermediate between the hub and the rim, said members comprising diverging legs integrally connected at their outer and inner ends and being made of two halves, each half being stamped up from sheet metal to form a web in a plane transverse to the axis of the wheel with flanges on its edges.

2. A wheel comprising members intermediate between the hub and the rim, said members being of hollow, substantially rectangular cross-section and comprising diverging legs integrally connected at their outer and inner ends and being made of two halves, each half being of sheet metal stamped up to form a web in a plane transverse to the axis of the wheel with flanges on its edges forming with the flanges of the other the desired hollow cross-section.

3. A wheel comprising members intermediate between the hub and rim, said intermediate members being hollow in cross-section and comprising diverging legs connected by a transverse portion at their outer ends each of said members comprising segments welded together on a plane transverse to the axis of the wheel.

4. A wheel comprising members intermediate between the hub and rim, said intermediate members being of hollow substantially rectangular cross-section and comprising diverging legs connected by a transverse portion at their outer ends each of said members comprising segments which are channel shaped in cross-section and are bent to form the said legs and transverse portion, said segments being welded together on a plane transverse to the axis of the wheel.

In witness whereof, I have hereunto signed my name.

THOMAS E. MURRAY.